(12) United States Patent
Muramatsu et al.

(10) Patent No.: US 6,358,426 B1
(45) Date of Patent: Mar. 19, 2002

(54) METHOD OF FABRICATING PROBE FORCE ATOMIC FORCE MICROSCOPE

(75) Inventors: Hiroshi Muramatsu; Nobuhiro Shimizu, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/235,668

(22) Filed: Jan. 22, 1999

Related U.S. Application Data

(62) Division of application No. 08/812,846, filed on Mar. 6, 1997, now Pat. No. 5,877,412.

(30) Foreign Application Priority Data

Mar. 8, 1996 (JP) .............................................. 8-052109
Nov. 6, 1996 (JP) .............................................. 8-294045

(51) Int. Cl.[7] .............................. B44C 1/22; G01B 5/28
(52) U.S. Cl. ................................ 216/11; 216/2; 73/105
(58) Field of Search .......................... 216/11, 2; 73/105

(56) References Cited

U.S. PATENT DOCUMENTS

| | | | | |
|---|---|---|---|---|
| 5,021,364 A | * | 6/1991 | Akamine et al. ............ | 437/228 |
| 5,116,462 A | * | 5/1992 | Bartha et al. .................. | 216/11 |
| 5,264,696 A | * | 11/1993 | Toda ............................ | 250/234 |
| 5,272,913 A | * | 12/1993 | Toda et al. .................... | 73/105 |
| 5,336,369 A | * | 8/1994 | Kado et al. .................... | 216/11 |
| 5,883,387 A | * | 3/1999 | Matsuyama et al. ........ | 250/306 |

FOREIGN PATENT DOCUMENTS

| | | |
|---|---|---|
| JP | 3218998 | 9/1991 |
| JP | 6042952 | 2/1994 |
| JP | 6323845 | 11/1994 |
| JP | 6103176 | 12/1994 |

OTHER PUBLICATIONS

Khaled Karrai et al.., "Piezoelectric tip–sample distance control for near field optical microscopes," Applied Physics Letters, vol. 66, No. 14, pp. 1842–1844, American Institute of Physics, 1995.

Appl. Phys. Lett. 66 (24), Jun. 12, 1995, pp. 3245–3247, "Near–Field Optical Microscopy in Liquids" by H. Muramatsu et al., American Institute of Physics.

* cited by examiner

*Primary Examiner*—Randy Gulakowski
*Assistant Examiner*—Shamim Ahmed
(74) *Attorney, Agent, or Firm*—Adam & Wilks

(57) ABSTRACT

A method of fabricating a probe comprises disposing a resist film over a base plate. A mask pattern comprised of a cantilever mask pattern and a probe mask pattern is disposed over the base plate for forming a cantilever portion and a probe portion, respectively, of a probe so that the probe mask pattern subtends an angle relative to the base plate that is no greater than an angle made by at least two crystal planes of a tip of the probe portion to the base plate. The mask pattern is then exposed, and an etching operation is conducted using the exposed mask pattern to form the probe having the cantilever portion and the probe portion.

28 Claims, 11 Drawing Sheets

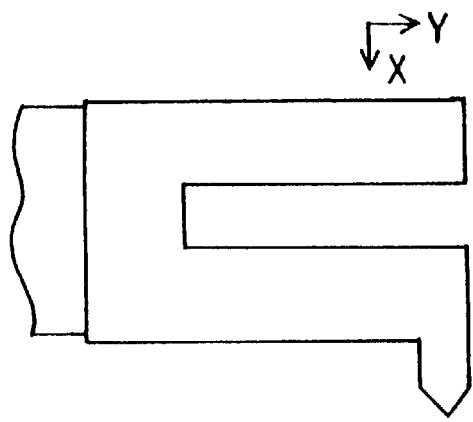
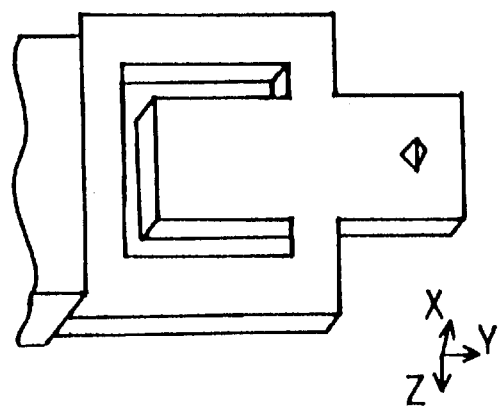
F I G. 6A
F I G. 6B
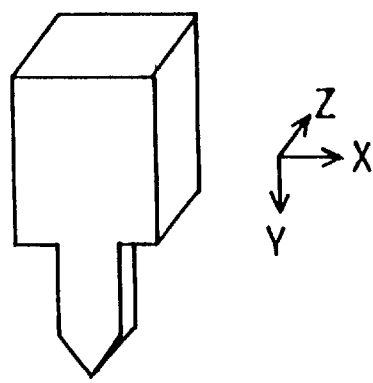
F I G. 7
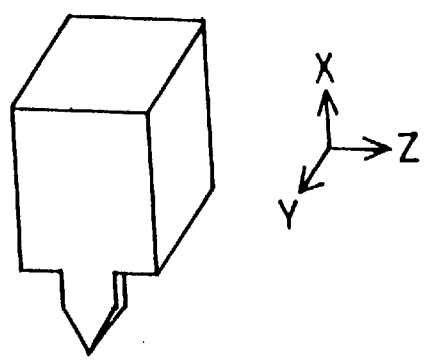
F I G. 8

F I G. 14
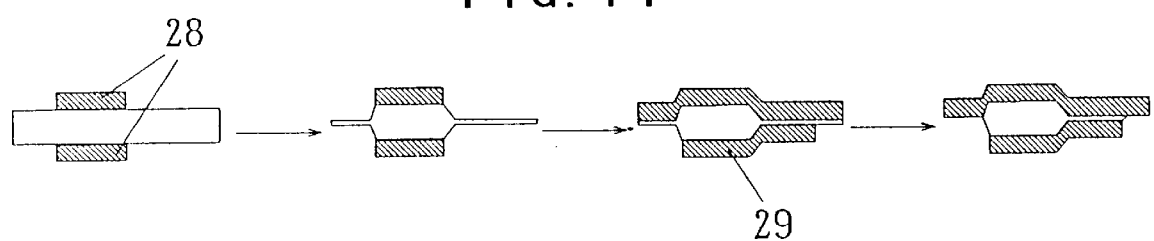

FIG. 15
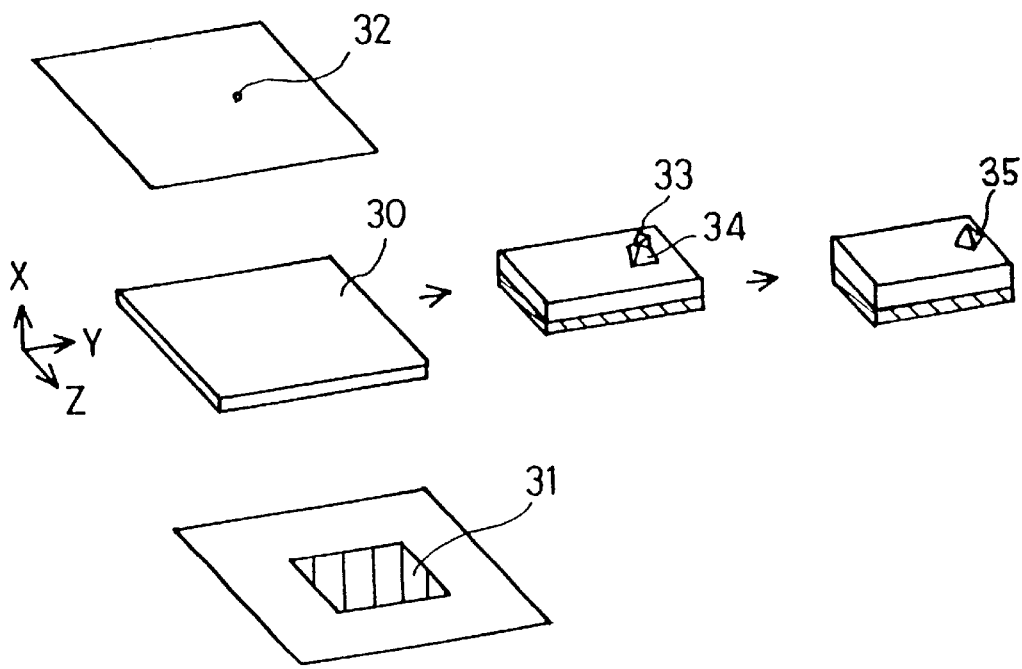
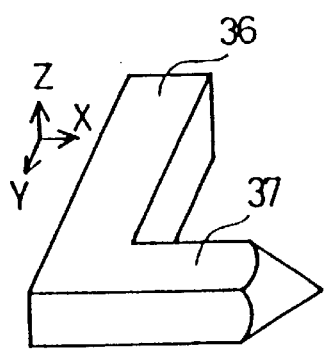
FIG. 16A
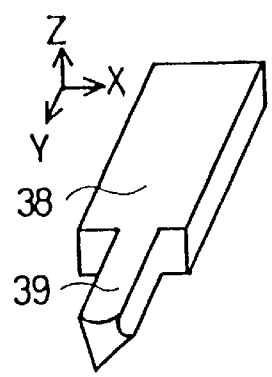
FIG. 16B
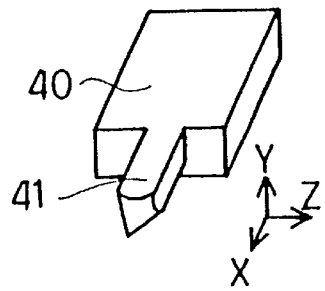
FIG. 16C

METHOD OF FABRICATING PROBE FORCE ATOMIC FORCE MICROSCOPE

The present application is a division of U.S. application Ser. No. 08/812,846, filed on Mar. 6, 1997 U.S. Pat. No. 5,877,412, which is hereby incorporated by reference, and priority thereto for common subject matter is hereby claimed.

BACKGROUND OF THE INVENTION

The present invention relates to a scanning atomic force microscope for observing the topography of a specimen surface by making use of an atomic force exerted between substances.

The prior art scanning atomic force microscope uses a probe comprising a cantilever and a probe portion formed over the cantilever which is made of silicon nitride or silicon. The atomic force exerted between the probe portion and the specimen surface is detected as a deflection of the cantilever, a change in the amplitude of the vibration, or a change in the resonance frequency. The probe tip and the specimen are moved relative to each other while maintaining the distance between them constant. Thus, the specimen surface is observed. In this case it is common practice to utilize an optical procedure, for detecting the displacement of the cantilever. Where such an optical procedure is employed, the instrumentation is complicated. Furthermore, various adjustments such as adjustment of the optic axis are necessary. Hence, it has been complex and laborious to handle the instrument.

In connection with them, a cantilever incorporating a piezoelectric detection mechanism for electrically detecting vibrations is described in Japanese Patent Unexamined Publication No. 196458/1993. Also, AFM (atomic force microscope) probes using quartz oscillators have been proposed in Japanese Patent Unexamined Publication Nos. 309803/1988 and 102008/1992.

In the case of the above-cited Japanese Patent Unexamined Publication No. 196458/1993 where displacements of the cantilever are electrically detected without using any optical procedure, a process for forming a thin piezoelectric film is involved. Therefore, the fabrication of the probe is complicated.

In the quartz oscillator probe described in the Japanese Patent Unexamined Publication No. 309803/1988, the quartz oscillator adheres to the probe portion together. This structure is not easy to manufacture. The quartz oscillator probe described in the Japanese Patent Unexamined Publication No. 102008/1992 is not associated with electrical detection. Moreover, no detailed description is made of the fabrication. Accordingly, a method of easily fabricating an atomic force microscope (AFM) probe using a quartz oscillator and a scanning atomic force microscope which is easy to handle have been sought for.

Furthermore, in the AFM probe, sharpening of the probe tip presents problems. Accordingly, it is an important object to provide a method of sharpening the tip.

SUMMARY OF THE INVENTION

It is an object of the invention to provide an apparatus of AFM that has simple structure and has a no necessity of adjusting the optic axis.

Another object of the invention is to provide a method for forming easily a probe for AFM.

A further object of the invention is to provide a method for sharpening a tip of a probe for AFM.

To attain the above objects, an atomic force microscope (AFM) probe is comprised of a probe portion made of quartz and a cantilever portion made of the same quartz as the probe portion. The probe portion has a tip which is formed as the intersecting point, or vertex, of three planes including at least two crystal planes. Electrodes for electrically detecting deflections of the cantilever are formed thereon. This AFM probe is fabricated by a method consisting, for example, of exposing a resist, using a cantilever mask and a probe mask, and performing an etching process, based on a pattern obtained by the exposure. The cantilever mask is placed in position in the Y direction relative to a quartz base plate or substrate lying in the Z-plane. The probe mask is placed in position in the X direction relative to the quartz substrate and subtends an angle not exceeding the angle that two crystal planes make to the substrate.

The invention also provides an AFM probe comprising a cantilever and a probe portion having a tip extending in the X direction. The probe tip assumes a pyramidal form and has been sharpened by isotropic etching. The cantilever is formed over a quartz substrate lying in the Z-plane and extends in the Y direction. This AFM probe can be fabricated, for example, by performing exposure of resist, using a cantilever mask and a probe mask, and performing an etching process, based on a pattern obtained by the exposure. The cantilever mask is formed over the quartz substrate and extends in the Y direction. The probe mask is shaped like a belt and extends in the X direction.

In addition, the present invention provides a scanning atomic force microscope comprising: any one of these AFM probes; a vibrating means for vibrating a piezoelectric body at its resonant frequency; a means for detecting changes in resonance characteristics of the probe as changes in electrical characteristics, said changes in resonance characteristics being caused by an atomic force exerted between the tip of the probe and a surface of said specimen; a control means for maintaining constant the space between the probe tip and the surface of the specimen according to the output signal from the detecting means; and a scanning means for observing topography of the surface of the specimen.

BRIEF DESCRIPTION OF DRAWINGS

FIGS. 6A and 6B are diagrams illustrating AFM probes according to the invention;

FIG. 7 is a view illustrating yet another AFM probe according to the invention;

FIG. 8 is a view illustrating still another AFM probe according to the invention;

FIG. 14 is a view illustrating a still further method of fabricating an AFM probe in accordance with the invention;

FIG. 15 is a view illustrating an additional method of fabricating an AFM probe in accordance with the invention;

FIGS. 16A, 16B and 16C are views illustrating AFM probes according to the invention;

FIG. 23A shows a step of forming a probe pattern and a cantilever pattern on opposite surfaces of a base plate, FIG. 23B shows a step of etching the probe pattern, the cantilever pattern, and the base plate, FIG. 23C shows a step of depositing a protective coating over the probe pattern, and FIG. 23D shows a step of etching the base plate and forming a probe portion.

DETAILED DESCRIPTION OF THE PREFERRED EMBODIMENTS

Figure 1:
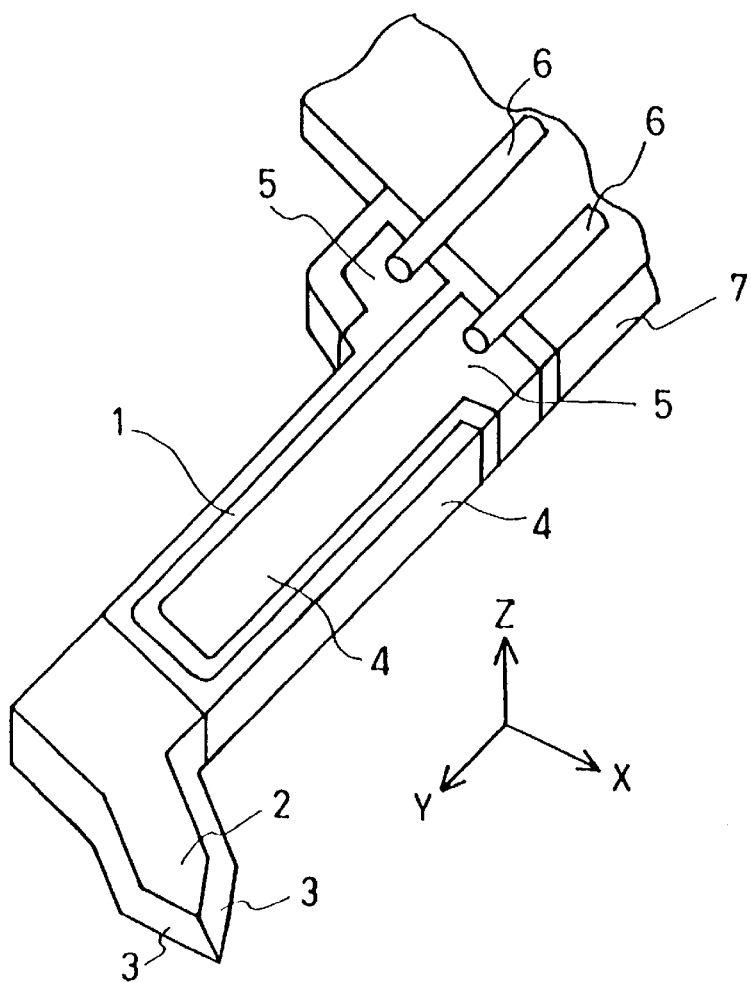
FIG. 1 is a view illustrating an AFM (atomic force microscope) probe according to the present invention.

Embodiments of the present invention are hereinafter described by referring to the drawings.

FIG. 1 shows one example of a probe according to the invention, the probe being for use in atomic force microscopy (AFM). The AFM probe consists principally of quartz and is composed of a body having a cantilever portion 1 and a probe portion 2. In particular, the probe portion is made from quartz that is a single-crystal material. The probe portion has a tip which is formed as the intersecting point, or vertex, of three planes including at least two crystal planes 3.

Figure 2:
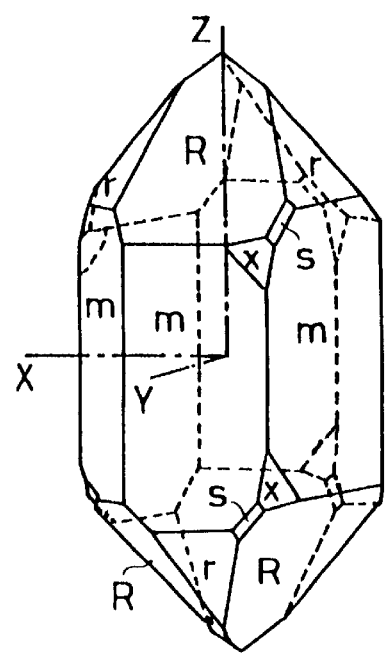
FIG. 2 illustrates crystal planes of a quartz crystal.

As shown in FIG. 2, the crystal planes of the quartz include R-plane, r-plane, s-plane, and x-plane with respect to the crystallographic axes X, Y, and Z. Etching can make some crystal planes emerge from inside the quartz substrate, depending on the conditions of the etching. That is, the etch rate in the crystallographic orientation of quartz differs according to the etching condition. Therefore, certain crystal planes can be made to emerge using an etchant which provides different etch rates. For example, etching using a mixture liquid of hydrofluoric acid and ammonium fluoride produces less different etch rates. On the other hand, where etching is done using an aqueous solution of hydrofluoric acid, more widely different etch rates are produced. Hence, certain crystal planes can be more readily made to emerge. Especially, for the R-plane, the etch rate is relatively slow and so it is easy to make this plane emerge by etching.

On the other hand, in FIG. 1, the AFM probe has been obtained by processing a quartz lying in the Z-plane. The probe is so formed that the sense of the probe tip and the direction of deflections of the cantilever lie along the X-axis of the quartz crystal, because the piezoelectric effect of the quartz, i.e., deflections of the quartz, acts on a plane lying in the X direction.

Accordingly, in FIG. 1, the cantilever portion 1 is made of the same quartz as the probe portion. In addition, electrodes 4 for electrically detecting deflections of the cantilever are formed in pairs on the four surfaces of the cantilever. The electrodes have a function of vibrating the cantilever by applying an AC electric signal, as well as the function of electrically detecting the deflections.

Referring also to FIG. 1, the electrodes 4 contain electrode terminals 5 and are electrically connected together by lead wires 6 and supported by a support base plate 7.

FIG. 3 depicts views of the tip of the novel AFM probe, taken from the side of the tip and from the direction of one side surface, respectively. FIG. 3a shows a probe portion whose tip is composed of two crystal planes and a face of the base plate. In this case, if the probe is fabricated by etching the quartz substrate lying in the Z-plane, it follows that both of these two crystal planes lie either in the +Z direction or in the –Z direction of the quartz crystal. FIG. 3b shows a probe portion whose tip consists of three crystal planes. In this case, if two surfaces are planes on the side of the +Z-axis, then the other surface is formed by a plane on the side of the –Z-axis.

Figure 4:
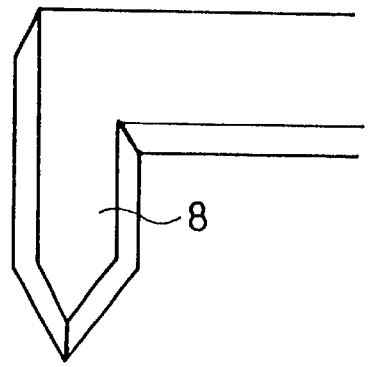
FIG. 4 is a view illustrating another AFM probe tip portion according to the invention.

FIG. 4 shows an example in which a probe support portion 8 is inserted between a cantilever and a probe portion. The formation of this support portion 8 permits measurements of specimens having great irregularities. In this case, it is necessary that the support portion 8 be formed between the probe tip formed by crystal planes and the cantilever portion so as to subtend an angle which is no greater than the angle that the crystal planes form to the base plate.

Figure 5A:
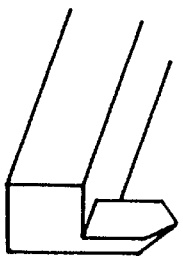
FIGS. 5A and 5B are views illustrating further AFM probe tip portions according to the invention.
Figure 5B:
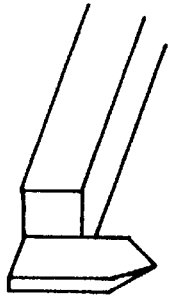

FIGS. 5A and 5B show examples in which either the probe portion or the probe portion, its support portion, and a cantilever portion continuous with them are made partially thinned compared with the thickness of the cantilever portion taken in the Z direction. By increasing the aspect ratio in this way, it is possible to cope with measurements of specimens of greater irregularities.

Where the novel AFM probe is vibrated in use, mechanical loss can be reduced and the Q value is increased during the vibration. Thus, control can be provided with higher sensitivity. Therefore, as shown in FIGS. 6A and 6B, the mechanical loss can be reduced by fabricating a second cantilever integrally with a first cantilever having a probe tip so that these two cantilevers can vibrate in pairs. FIG. 6A shows an example in which a cantilever is fabricated like a tuning fork out of a plate lying in the Z-plane. FIG. 6B shows an example in which cantilever portions fabricated out of a plane lying in the X-plane are arranged symmetrically with respect to a central, support portion. In FIG. 6, electrodes are omitted. In practice, the electrodes are so disposed that a pair of cantilever portions vibrate symmetrically.

Thus far AFM probes utilizing an atomic force acting in the normal direction between a specimen surface and the probe portion have been described. The invention can also be applied to an AFM probe where a lateral force is controlled, as described in Japanese Patent Unexamined Publication No. 50750/1994. In this case, as shown in FIG. 7, a probe portion is formed so as to extend in the Y direction. A cantilever deflects in the X direction.

Moreover, a probe making use of shear or slipping vibrations as described in the Japanese Patent Unexamined Publication No. 309803/1988 can be accomplished by fabricating a base plate or substrate out of a quartz lying in the Y-plane and thinning its probe portion along the X axis and on the side of one face lying in the Y plane, as shown in FIG. 8.

Methods of fabricating the AFM probes described thus far are next described.

Figure 9:
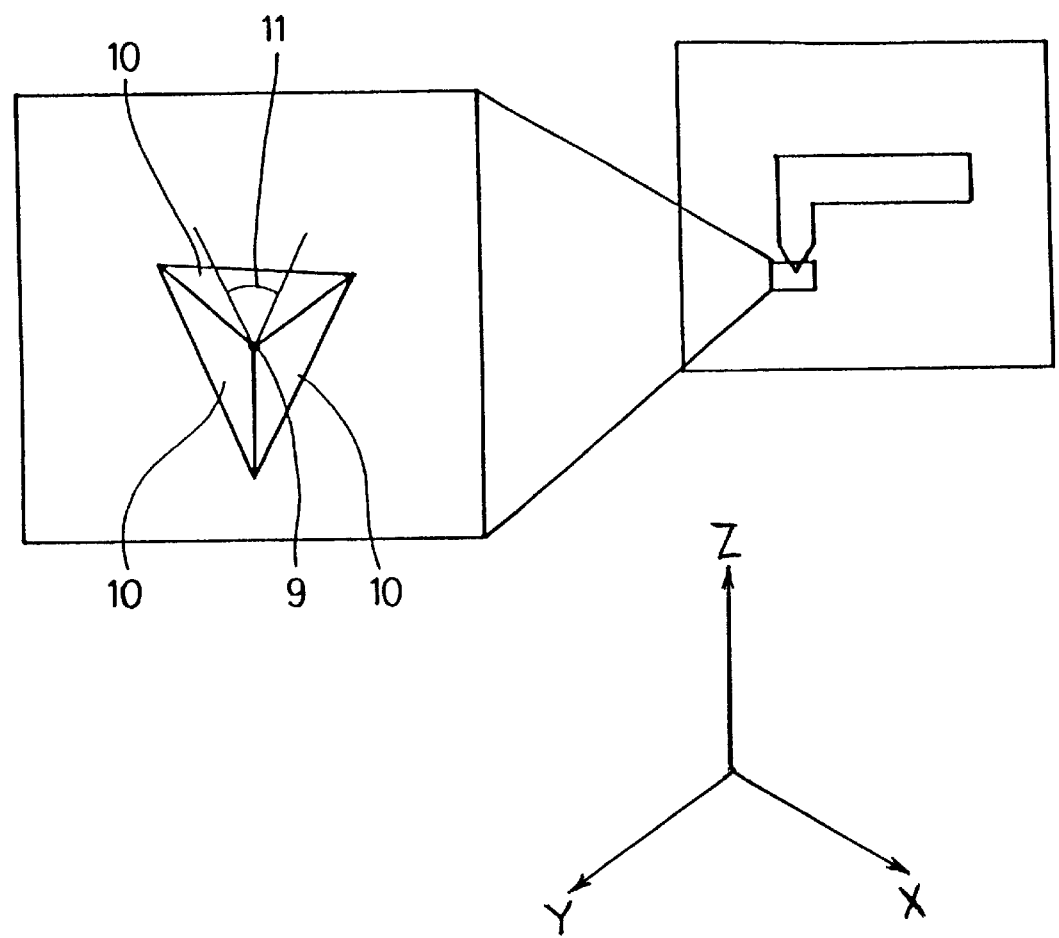
FIG. 9 is a view illustrating a method of fabricating an AFM probe in accordance with the invention.

FIG. 9 illustrates the principle of fabrication of the tip of a probe portion. In FIG. 9, a mask for a cantilever (often referred to herein as the cantilever mask) is placed in position in the Y direction relative to a quartz base plate lying in the Z-plane. A mask for a probe portion (often referred to herein as the probe mask) is placed in position in the X direction. It is assumed that crystal planes formed by etching from one point 9 at the probe tip are R planes. These planes appear as three crystal planes 10. Accordingly, in order to make at least two crystal planes appear, it is necessary that an angle 11 subtended by a mask at the probe tip be no greater than the angle that the two crystal planes make to the base plate. That is, a resist is exposed, using the probe mask with the angle 11 which is no greater than the angle that the two crystal plane make to the base plate. Then, an etching process is carried out, based on the pattern obtained by the exposure. The etching is made to proceed until unmasked portions reach the opposite side of the base plate. Thus, the probe tip defined by the vertex, or intersection, of three planes including two crystal planes can be fabricated.

If etching is done at this time, it is desired to place a probe pattern only on one side of two mask patterns for the front and rear faces of the quartz plate, respectively. For example, if +Z- and −Z-planes are etched, and if the same probe pattern is arranged in the mask patterns on both sides, then the position where the probe tip is created will deviate because the crystal planes exhibit three-dimensional symmetry.

Figure 3A:
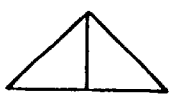
FIGS. 3A and 3B are diagrams illustrating the tip portions of AFM probes according to the invention.
Figure 3A:
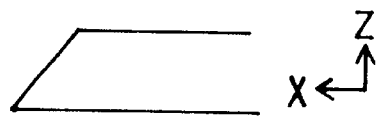
Figure 3B:
Figure 3B:
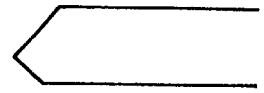
Figure 10:
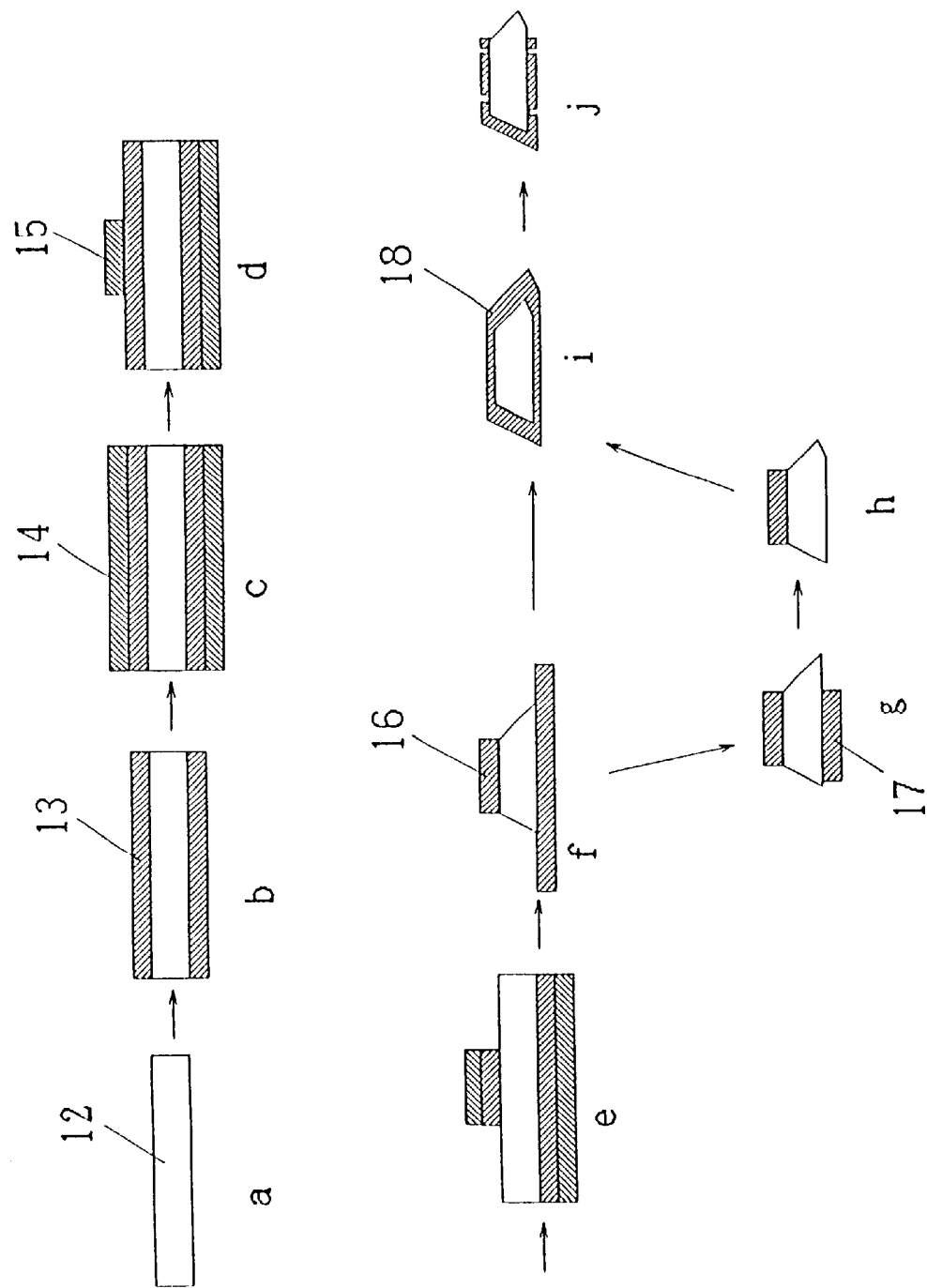
FIG. 10 is a view illustrating another method of fabricating an AFM probe in accordance with the invention.

FIG. 10 shows cross sections of the probe portion of an AFM probe according to the invention, illustrating one example of fabrication sequence for fabricating the AFM probe, using a quartz substrate or base plate 12 lying in the Z plane. First, an etch-masking protective film 13 consisting of a chromium layer and a gold layer is deposited on the quartz base plate (step 1). Then, a resist film 14 is applied (step 2). Subsequently, the mask pattern including the probe pattern is exposed (step 3). The resist is developed to form a developed resist film 15 (step 4). The protective film 13 is etched to form a protective film pattern 16 (step 5). The quartz base plate 12 is etched to complete the contour of the AFM probe (step 6) (FIG. 10f). Then, a metal layer 18 used to form electrodes acting as piezoelectric elements is formed. Before this formation of the metal layer 18, a protective film 17 formed from a mask pattern only for the cantilever portion may be deposited on the side opposite to the probe pattern to etch the probe portion further slightly, as shown in FIGS. 10g and h. In this way, a third, clear crystal plane can be formed at the probe tip as shown in FIG. 3b. It may be considered, however, that at the stage of the formation of the contour shown in FIG. 10f, the third crystal plane is almost fully formed by the fact that the etchant passes to the mask pattern through a non-straight route. Furthermore, the mask pattern 17 (FIG. 10g) is not always necessary. If the etching is performed without any mask pattern, a similar shape can be obtained although the cantilever portion is slightly etched. Where the probe tip is formed at the vertex of crystal planes in this way, the tip is sharpened on an atomic scale. Hence, a probe with high two-dimensional resolution is obtained.

Figure 11:
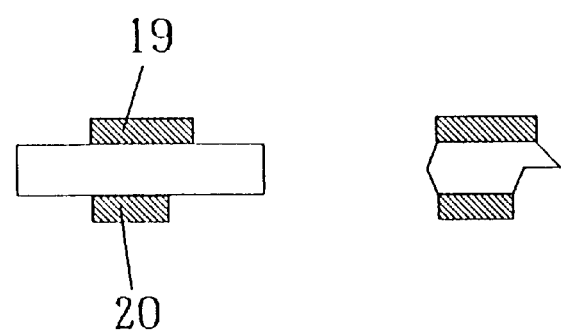
FIG. 11 is a view illustrating a further method of fabricating an AFM probe in accordance with the invention.

FIG. 11 shows an example in which a probe is fabricated by etching, using protective films 19 and 20 at the same time. The protective film 19 is formed with mask patterns including a probe pattern and a cantilever pattern. In this case, the thickness of the probe portion can be almost halved compared with the probe shown in FIG. 10.

A fabrication method for decreasing the thickness of the probe portion further is next described.

Figure 12:
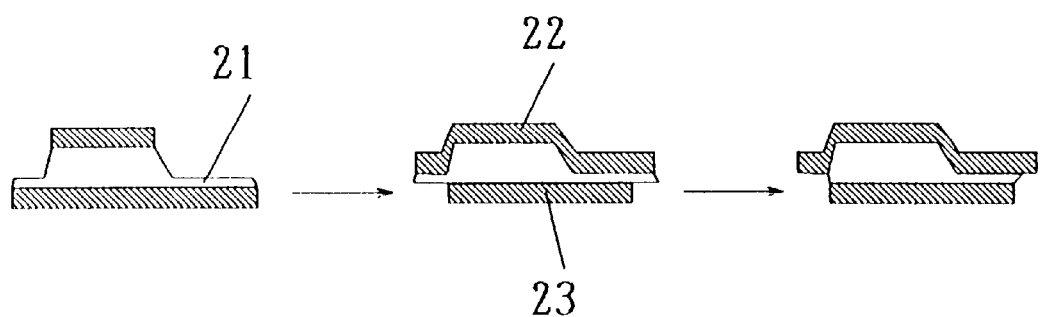
FIG. 12 is a view illustrating a yet further method of fabricating an AFM probe in accordance with the invention.

In the example of FIG. 12, an etch-masking protective film consisting of a chromium layer and a gold layer is deposited (step 1). Then, a resist is applied (step 2). Subsequently, a mask pattern not including a probe pattern is exposed (step 3). The resist is developed to form a developed resist film (step 4). The protective film is etched (step 5). The quartz base plate is etched until a portion 21 where a probe portion should be formed becomes thin. A protective film 22 is formed on the etched surface (step 6). A resist is applied to the surface opposite to the etched surface (step 7). The mask pattern is exposed (step 8). The resist is developed (step 9). The protective film is etched (step 10). As a result, a protective film pattern 23 consisting of a mask pattern is formed. The quartz base plate is etched to form the probe tip (step 11). In this case, the formation of the protective film 22 is not always necessary. In the absence of the protective film 22, the thickness of the probe portion decreases further. However, where the probe portion is not sufficiently thin, any unintentional crystal plane may appear at the probe tip.

Figure 13:
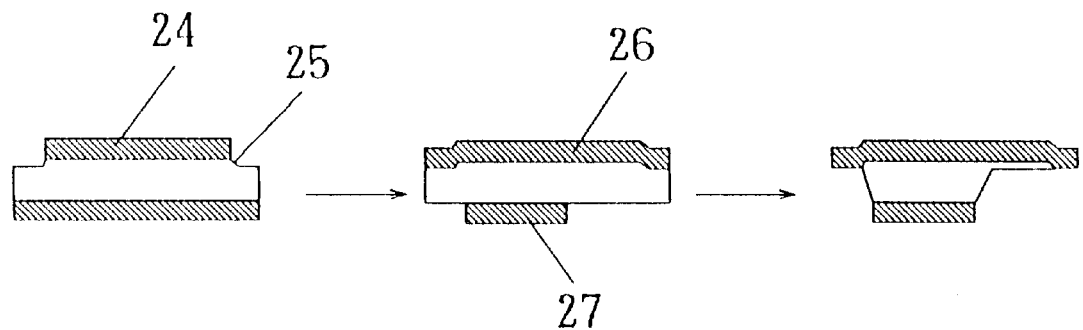
FIG. 13 is a view illustrating an additional method of fabricating an AFM probe in accordance with the invention.

In the example of FIG. 13, an etch-masking protective film consisting of a chromium layer and a gold layer is deposited (step 1). Then, a resist is applied (step 2). Subsequently, a mask pattern including a probe pattern is exposed (step 3). The resist is developed to form a developed resist film (step 4). The protective film is etched to form a protective film pattern 24 (step 5). The quartz base plate is etched until a probe portion 25 is started to be formed (step 6). An etch-masking protective film 26 is formed on the etched surface (step 7). A resist is applied to the surface opposite to the etched surface (step 8). The mask pattern is exposed (step 9). The resist is developed (step 10). The protective film is etched to form a pattern 27 consisting only of a cantilever pattern without any mask pattern (step 11). The quartz base plate is etched to form the probe tip (step 12).

FIG. 14 shows an example of method of fabricating a probe portion. A pattern 28 consisting only of a cantilever pattern is formed and then the quartz base plate is etched until its central portion becomes thin. Thereafter, the cantilever pattern is removed. A probe pattern 29 is formed on one side. The opposite side is fully masked.

Figure 23A:
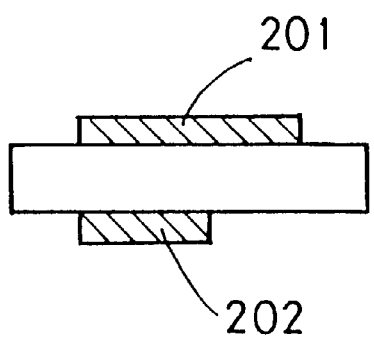
FIGS. 23A–23D show a method of fabricating an AFM probe according to the present invention, where
Figure 23B:
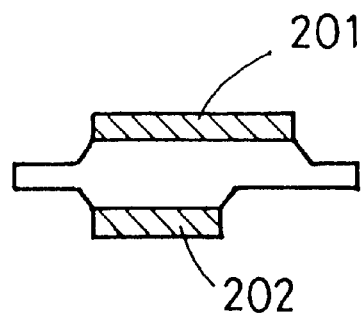
Figure 23C:
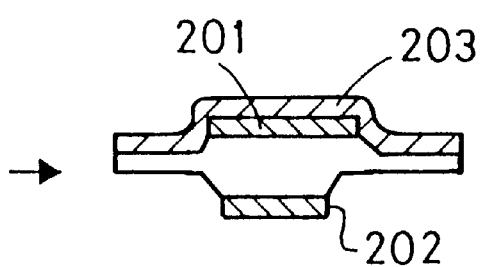
Figure 23D:
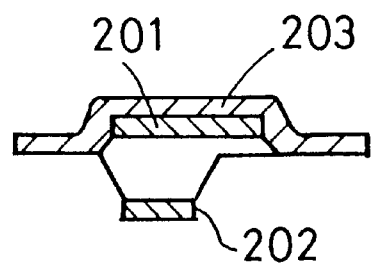

FIGS. 23A, 23B, 23C and 23D show a further example of method. A probe pattern 201 and a cantilever pattern 202 are first formed on opposite surfaces (FIG. 23A). Slight etching is performed (FIG. 23B). Then, a protective coating 203 is deposited over the probe pattern 201 (FIG. 23C). Etching is performed until the base plate is etched out and the probe portion is formed (FIG. 23D). In this method, a thin probe portion can be fabricated by forming the mask pattern only at an early stage.

By these methods, either the probe portion or the probe portion, its support portion, and a contiguous cantilever portion can be partially made thinner than the thickness of the cantilever portion taken along the Z-axis.

A method of fabricating a probe by making use of etching of a quartz plate lying in the X-plane is next described. In FIG. 15, a resist is exposed, using a mask 31 for a cantilever and a mask 32 for a probe portion. The cantilever mask 31 is placed in position in the Y direction relative to a quartz plate 30 lying in the X-plane. The probe mask 32 is formed like a spot near the front end of the cantilever. Etching is performed, based on the pattern obtained by the exposure. Thus, a protrusion 34 consisting of crystal planes and capped with a probe-protecting film 33 can be fabricated. A protrusion 35 capped with the crystal planes can be formed by etching out the probe-protecting film 33. The contour of the quartz substrate is completed in this way. Driver electrodes are formed on this quartz substrate. In consequence, this probe can be used as an AFM probe.

Thus far an AFM probe fabricated, using anisotropic etching of quartz, has been described. An example of AFM probe using a probe tip which is formed by isotropic etching is next described.

FIG. 16a shows an AFM probe comprising a cantilever 36 extending in the Y direction of a quartz substrate lying in the Z-plane and a pyramidal probe portion 37 extending in the X direction. The tip of the probe portion 37 has been sharpened by isotropic etching.

FIG. 16b shows an example of AFM probe comprising a probe portion extending in the Y direction and a cantilever 38 deflecting in the X direction. The probe portion, 39, assuming a pyramidal form has its tip sharpened by isotropic etching.

FIG. 16c shows an example of AFM probe fabricated, based on a quartz substrate 40 lying in the Y-plane. The probe has a thin, pyramidal probe portion 41, which extends in the X direction and is shifted toward one face lying in the Y-plane. The tip of the probe portion has been sharpened by isotropic etching.

Where isotropic etching is utilized in this way, the radius of curvature of the probe tip is made larger than that of the tip formed by crystal planes. However, it is easy to obtain a tip contour having a large aspect ratio. This structure can be operated as an AFM probe by forming electrodes (not shown in FIG. 16) for electrically detecting deflections of the cantilever on it.

In the case of the example of FIG. 16c, this AFM probe can be fabricated by exposing a resist through the use of a cantilever mask and a probe mask, performing etching, based on the pattern obtained by the exposure, and then performing isotropic etching to sharpen the probe tip. The cantilever mask is formed so as to extend in the Y direction relative to a quartz substrate lying in the Z-plane. The probe mask is formed like a belt extending in the X direction.

Figure 17:
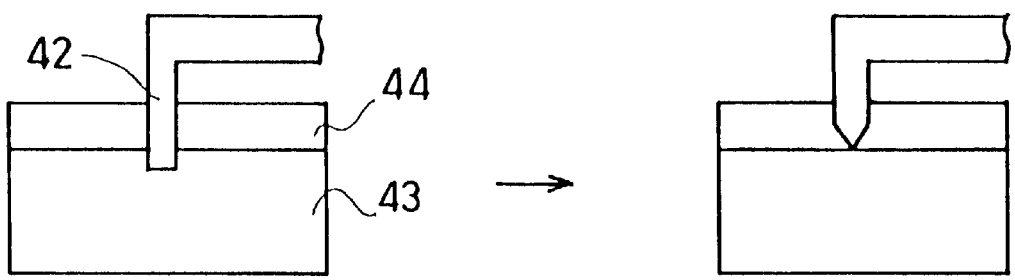
FIG. 17 is a view illustrating a method of fabricating an AFM probe in accordance with the invention.

The isotropic etching method is now described. FIG. 17 illustrates a method of sharpening the tip of a pyramidal probe portion 42 by performing etching at the interface between etchant 43 and non-etching liquid 44 spread over the etchant. A mixture liquid of hydrofluoric acid and ammonium fluoride which produces less different etch rates at crystal planes as mentioned above is appropriately used as the etchant. Organic solvent, oil, or other hydrophobic liquid having a specific gravity smaller than that of the etchant can be used as the non-etching liquid.

Figure 18:
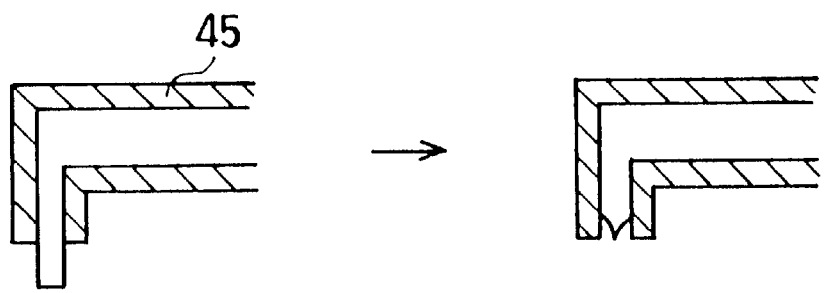
FIG. 18 is a view illustrating another method of fabricating an AFM probe in accordance with the invention.
Figure 19:
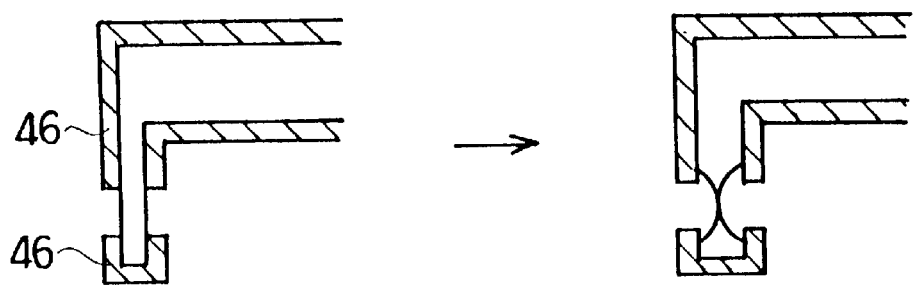
FIG. 19 is a view illustrating a further method of fabricating an AFM probe in accordance with the invention.

FIG. 18 depicts a procedure for etching the tip of a probe portion 42 shaped like a belt by covering the probe portion 42 excluding around its tip with an etch-masking protective film 45 and etching the probe tip by anisotropic etching means. FIG. 19 illustrates a procedure for etching a probe portion 42 shaped like a belt by coating the probe portion 42 excluding its intermediate portion with an etch-masking protective film 46 and etching the probe tip by isotropic etching means. In the procedures shown in FIGS. 18 and 19, the etching means can be either etching making use of a mixture liquid of hydrofluoric acid and ammonium fluoride or reactive ion beam etching.

The isotropic etching can be performed more uniformly by annealing the portion to be etched prior to the etching process. One example of the annealing consists of locally irradiating the quartz with carbon dioxide gas laser light to heat the quartz up to its melting point so that it vitrifies.

Furthermore, in the AFM probes described above, the diameter at the tip of the probe portion can be reduced further and the aspect ratio can be enhanced by directing an ion beam from the side of the probe tip.

The configurations of scanning atomic force microscopes using the AFM probes described above are next described.

Figure 20:
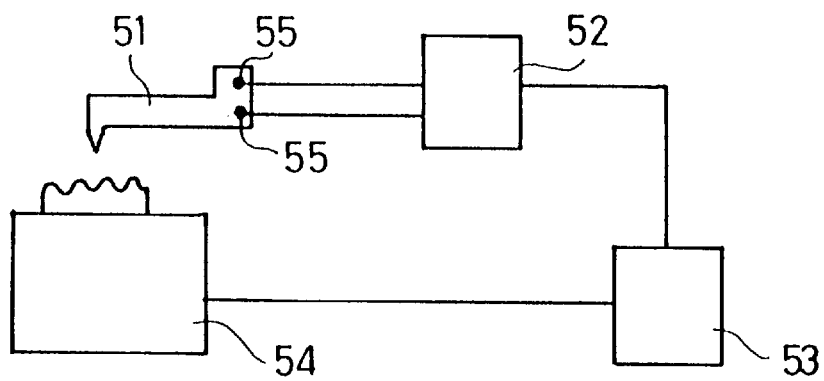
FIG. 20 is a diagram illustrating a scanning atomic force microscope according to the invention.

Referring to FIG. 20, an atomic force microscope comprises a vibrating means 52 for vibrating an AFM probe 51 according to the present invention at its resonant frequency, a detecting means 80 for detecting changes in the resonant characteristics of the probe as changes in electrical characteristics, and a control means 53. The changes in the resonant characteristics are caused by the action of an atomic force exerted between the tip of the probe and a specimen surface. The control means 53 maintains constant the space between the tip of the probe and the specimen surface according to the output signal from the detecting means 80. A scanning means 54 permits observation of the topography of the specimen surface.

In this case, the vibrating means 52 is a driver circuit for generating an AC driving signal for electrically driving the cantilever. The detecting means 80 detects a change in the electrical current of the AC driving signal from electrodes 55 mounted on the probe, the change being caused by the action of an atomic force. The detecting means 80 then produces an output signal for maintaining constant the space between the tip of the probe and the specimen surface.

Figure 21:
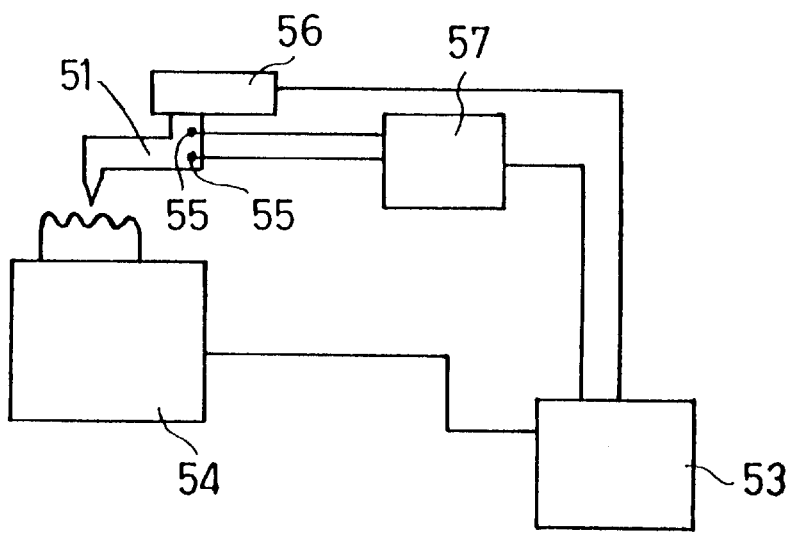
FIG. 21 is a diagram illustrating another scanning atomic force microscope according to the invention.

A modified structure is shown in FIG. 21. The vibrating means consists of a bimorph 56 for externally vibrating the cantilever. As a result of the vibration, electric charge is induced on the probe. This charge is varied by the action of an atomic force. The detecting means 57 detects this change from the electrodes 55, and produces an output signal for maintaining constant the space between the tip of the probe and the specimen surface.

In addition, the space between the tip of the probe and the specimen surface can be maintained constant by comparing the vibrating signal from the vibrating means with the electrical output signal from the electrodes 55 on the probe in terms of their phase so that the frequency of the exciting signal follows the resonant frequency of the cantilever. A change in the resonant frequency caused by generation of an atomic force is detected. According to the resulting signal, the resonant frequency is maintained constant. In this way, the space between the tip of the probe and the specimen surface can be kept constant.

Figure 22:
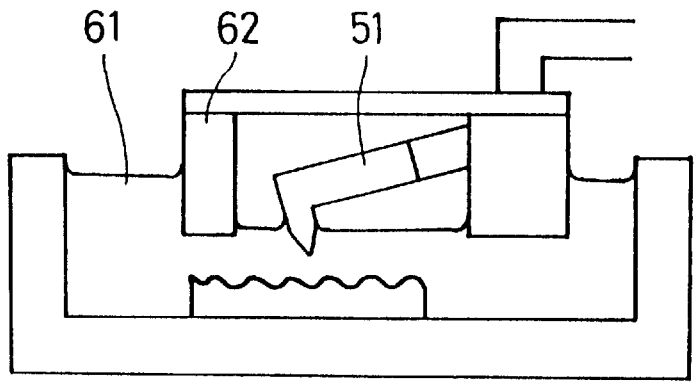
FIG. 22 is a diagram illustrating a further scanning atomic force microscope according to the invention.

A configuration in which a measurement is made within a liquid, using a probe according to the invention, is next described. In FIG. 22, a cover 62 which covers top and side surfaces of a cantilever probe portion 51 is mounted. The cover forces the tip of the probe to be inserted in a liquid 61 which is also spread over the specimen surface. Thus, the specimen surface can be observed in a liquid environment. Only the tip of the probe is immersed in the liquid. In this way, measurements within a liquid are enabled.

Where the probe described above makes use of deflections in the X direction, the length of the cantilever is about 0.2 to 2 mm. The resonant frequency can be varied within the range of from approximately 10 kHz to 500 kHz by changing the length or thickness of the cantilever portion. With respect to the Q value, values on the order of 1000 are usually obtained. In the case of a structure producing symmetrical vibrations, Q values of about 10,000 are obtained. Where a plate lying in the Y-plane is used, the thickness is about 0.1–0.5 mm, and the resonant frequency is approximately 5 to 20 MHz. In atomic microscopy using the novel probe, the distance between the probe tip and specimen can be controlled with a sensitivity comparable to or exceeding the sensitivity with which the prior art cantilever of silicon or silicon nitride is controlled by an optical procedure.

In the description provided thus far, the plates lying in the X-, Y-, and Z-planes are not always required to lie strictly within the X-, Y-, and Z-planes. If the plates are slightly tilted to the crystal axes, no practical problems will take place.

It is also to be noted that only one probe is shown in each of the figures illustrating embodiments of the fabrication method. In practice, plural probes can be fabricated within the same substrate. In particular, the probes can be held within the substrate until the fabrication process ends by performing a patterning step in such a way that a base portion where the electrodes of the probes are arranged is held to the substrate.

The present invention is practiced in forms as described thus far and produces the following effects.

AFM probe and scanning atomic force microscope according to the present invention enable simple observations without using the prior art light detection procedure. The inventive AFM probe fabrication method makes it possible to fabricate probes relatively easily. Furthermore, high-resolution AFM probes can be provided.

What is claimed is:

1. A method of fabricating a probe for an atomic force microscope, comprising the steps of: providing a base plate; disposing a resist film over the base plate; forming a mask pattern comprised of a cantilever mask pattern and a probe mask pattern over the base plate so that the probe mask pattern subtends a first angle relative to the base plate; exposing the mask pattern; developing the resist film; and performing an etching operation using the exposed mask pattern to form a probe having a cantilever portion and a probe portion so that at least two crystal planes of a tip of the probe portion subtend a second angle relative to the base plate which is not less than the first angle.

2. A method according to claim 1; wherein the base plate comprises a quartz substrate having a first surface and a second surface opposite the first surface; and wherein the step of providing a mask pattern comprises providing a probe pattern on the first and second surfaces of the quartz substrate.

3. A method according to claim 2; wherein the quartz substrate extends in the Z direction; and further comprising the steps of forming a protective film on the quartz substrate before forming the resist film, developing the resist film, and thereafter etching the protective film before etching the quartz substrate.

4. A method of fabricating a probe for an atomic force microscope, comprising the steps of: providing a base plate having a first surface and a second surface opposite the first surface; forming a protective film on the first surface of the base plate; disposing a resist film over the protective film; forming a mask pattern comprised of a cantilever mask pattern and a probe mask pattern over the base plate so that the probe mask pattern is disposed over the first and second surfaces of the base plate and subtends a first angle relative to the base plate; exposing the mask pattern; developing the resist film; etching the protective film; etching the base plate; disposing a second resist film on the second surface of the base plate; exposing the mask pattern; developing the second resist film; etching the protective film; and etching the base plate to form a probe having a cantilever portion and a probe portion so that at least two crystal planes of a tip of the probe portion subtend a second angle relative to the base plate which is not less than the first angle.

5. A method according to claim 4; wherein the base plate extends in the Z direction.

6. A method according to claim 5; wherein the base plate comprises a quartz substrate.

7. A method according to claim 4; wherein the base plate comprises a quartz substrate.

8. A method of fabricating a probe for an atomic force microscope, comprising the steps of: providing a base plate having a first surface and a second surface opposite the first surface; forming a first protective film on the first surface of the base plate; disposing a first resist film over the first protective film; forming a mask pattern comprised of a cantilever mask pattern and a probe mask pattern over the base plate so that the probe mask pattern is disposed over the first and second surfaces of the base plate and subtends a first angle relative to the base plate; exposing the mask pattern; developing the first resist film; etching the first protective film; etching the base plate; forming a second protective film over an etched surface of the base plate; disposing a second resist film on the second surface of the base plate; exposing the mask pattern; developing the second resist film; etching the second protective film; and etching the base plate to form a probe having a cantilever portion and a probe portion so that at least two crystal planes of a tip of the probe portion subtend a second angle relative to the base plate which is not less than the first angle.

9. A method according to claim 8; wherein the base plate extends in the Z direction.

10. A method according to claim 9; wherein the base plate comprises a quartz substrate.

11. A method according to claim 8; wherein the base plate comprises a quartz substrate.

12. A method of fabricating a probe comprising the steps of: providing a base plate; disposing a resist film over the base plate; providing a mask pattern comprised of a cantilever mask pattern and a probe mask pattern over the resist film; exposing the mask pattern; performing an etching operation using the exposed mask pattern to form a probe having a cantilever portion and a probe portion so that the probe portion has a probe tip which extends in a plane disposed generally parallel to a main surface of the base plate and which is formed as a vertex of three planes including at least two crystal planes; and forming electrodes on the cantilever portion for electrically detecting deflections of the cantilever portion.

13. A method according to claim 12; wherein the base plate extends in the Z direction.

14. A method according to claim 13; wherein the base plate comprises a quartz substrate.

15. A method according to claim 12; wherein the base plate comprises a quartz substrate.

16. A method according to claim 1; wherein the probe is formed so that the tip of the probe portion extends in a plane disposed generally parallel to a main surface of the base plate.

17. A method according to claim 16; wherein the base plate and the tip of the probe portion extend in the X direction and the cantilever portion extends in the Y direction.

18. A method according to claim 4; wherein the probe is formed so that the tip of the probe portion is in a plane disposed generally parallel to a main surface of the base plate.

19. A method according to claim 4; wherein the tip of the probe portion extends in the X direction, the cantilever portion extends in the Y direction, and the base plate extends in the Z direction.

20. A method according to claim 4; wherein the tip of the probe portion and the cantilever portion extend in the Y direction and the base plate extends in the Z direction.

21. A method according to claim 4; wherein the tip of the probe portion and the cantilever portion extend in the X direction and the base plate extends in the Y direction.

22. A method according to claim 8; wherein the probe is formed so that the tip of the probe portion extends in a plane disposed generally parallel to a main surface of the base plate.

23. A method of fabricating a probe for an atomic force microscope, comprising the steps of: providing a quartz substrate extending in one of an X, Y and Z direction; disposing a resist film over the quartz substrate; forming a mask pattern comprised of a cantilever mask pattern and a probe mask pattern over the quartz substrate so that the probe mask pattern subtends a first angle relative to the quartz substrate; exposing the mask pattern; developing the resist film; and performing an etching operation using the exposed mask pattern to form a probe having a cantilever portion and a probe portion each of which extends in one of the X, Y and Z directions in which the quartz substrate does not extend and, in which at least two crystal planes of a tip of the probe portion subtend a second angle relative to the quartz substrate which is not less than the first angle.

24. A method according to claim 23; wherein the tip of the probe portion extends in the X direction, the cantilever portion extends in the Y direction, and the quartz substrate extends in the Z direction.

25. A method according to claim 23; wherein the tip of the probe portion and the cantilever portion extend in the Y direction and the quartz substrate extends in the Z direction.

26. A method according to claim 23; wherein the tip of the probe portion and the cantilever portion extend in the X direction and the quartz substrate extends in the Y direction.

27. A method according to claim 23; wherein the quartz substrate has a first surface and a second surface opposite the first surface; and wherein the step of providing a mask pattern comprises providing the probe pattern on the first and second surfaces of the quartz substrate.

28. A method according to claim 27; wherein the quartz substrate extends in the Z direction; and further comprising the steps of forming a protective film on the quartz substrate before disposing the resist film, developing the resist film, and thereafter etching the protective film before etching the quartz substrate.

* * * * *